United States Patent
Aramaki

(10) Patent No.: US 6,810,269 B1
(45) Date of Patent: Oct. 26, 2004

(54) BASE STATION APPARATUS, ID CONTROL APPARATUS AND ID ASSIGNMENT METHOD

(75) Inventor: Takashi Aramaki, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 414 days.

(21) Appl. No.: 09/635,097

(22) Filed: Aug. 9, 2000

(30) Foreign Application Priority Data

Aug. 26, 1999 (JP) .......................................... 11-239435

(51) Int. Cl.$^7$ ................................................ H04B 1/38
(52) U.S. Cl. ...................... 455/560; 455/561; 455/446; 455/552.1
(58) Field of Search .............................. 455/561, 560, 455/446, 426.1, 552.1, 434

(56) References Cited

U.S. PATENT DOCUMENTS

| | | | |
|---|---|---|---|
| 5,873,047 A | * | 2/1999 | Nakano et al. ............. 455/561 |
| 5,918,181 A | * | 6/1999 | Foster et al. ............. 455/456.1 |
| 5,940,743 A | * | 8/1999 | Sunay et al. .................. 455/69 |
| 5,956,640 A | * | 9/1999 | Eaton et al. ............. 455/432.2 |
| 5,974,322 A | * | 10/1999 | Carlsson et al. ............. 455/446 |
| 6,011,787 A | * | 1/2000 | Nakano et al. ............. 370/335 |
| 6,119,021 A | * | 9/2000 | Katz ........................... 455/561 |
| 6,597,671 B1 | * | 7/2003 | Ahmadi et al. ............. 370/329 |

FOREIGN PATENT DOCUMENTS

| | | | |
|---|---|---|---|
| DE | 19740713 | | 4/1999 |
| EP | 0769884 | | 4/1997 |
| KR | 19990052179 | * | 7/1999 |
| WO | 9721317 | | 6/1997 |
| WO | 9922541 | | 5/1999 |

OTHER PUBLICATIONS

Korean Office Action dated Apr. 30, 2002.*
English translation of Korean Office Action.*

* cited by examiner

*Primary Examiner*—William Trost
*Assistant Examiner*—Sharad Rampuria
(74) *Attorney, Agent, or Firm*—Stevens, Davis, Miller & Mosher, LLP

(57) ABSTRACT

A newly installed base station apparatus requests a NET-ID control apparatus to assign network IDs. NET-ID search section 204 of the NET-ID control apparatus searches unused network IDs based on the content of NET-ID control table 205 that stores communication networks in correspondence with network IDs. NET-ID selection section 206 selects one of the searched network IDs, notifies the network ID to the base station apparatus and updates the content of NET-ID control table 205. This prevents network IDs from colliding with network IDs of adjacent networks.

1 Claim, 8 Drawing Sheets

| NET-ID | ASSIGNMENT |
|---|---|
| 0 | A |
| 1 | - |
| 2 | - |
| 3 | B |
| 4 | - |
| 5 | - |
| 6 | X |
| 7 | - |
| ... | ... |
| 1023 | - |

FIG.4B

| NET-ID | ASSIGNMENT |
|---|---|
| 0 | A |
| 1 | - |
| 2 | - |
| 3 | B |
| 4 | - |
| 5 | - |
| 6 | - |
| 7 | - |
| ... | ... |
| 1023 | - |

FIG.4A

BASE STATION APPARATUS, ID CONTROL APPARATUS AND ID ASSIGNMENT METHOD

BACKGROUND OF THE INVENTION

1. Field of the Invention

The present invention relates to a base station apparatus, ID control apparatus and ID assignment method used in a digital radio communication system.

2. Description of the Related Art

In a digital radio communication system including a plurality of base station apparatuses (hereinafter simply referred to as "base stations") that carry out a radio communication with at least one communication terminal apparatus, communication network identification is performed. This communication network identification is performed in the following cases:

(1) To check whether a network is connectable or not prior to authentication, etc. before starting a communication with a base station (AP) (at the time of so-called association) after power to the communication terminal is turned on (2) To verify a provider of new connection and services supported during handover Communication network identification is performed using a network ID (hereinafter referred to as "NET-ID"). For this NET-ID, several bits of BCCH (Broadcast Control CHannel) are used. Communication networks are identifiable by assigning this NET-ID to each communication network.

Generally, 10 bits of BCCH are used for a NET-ID, making a total of 1024 types of communication network identifiable. This NET-ID is determined when a communication network is installed using random numbers.

Determining a NET-ID using random numbers has an advantage that the NET-ID can be used immediately after a base station is installed and is a NET-ID determination method suited to base stations used for a household network or a small-scale office in-house LAN network.

However, determining a NET-ID using random numbers involves a risk that NET-IDs of adjacent networks will collide with each other. The problem when NET-IDs collide is that communication terminal apparatuses in such a network area can no longer identify the network and cause interference.

SUMMARY OF THE INVENTION

It is an object of the present invention to provide a base station apparatus, ID control apparatus and ID assignment method capable of preventing NET-IDs of adjacent networks from colliding with each other.

The present invention attains the above object by carrying out concentrated control over network IDs through an ID control apparatus and assigning network IDs to base station apparatuses.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which;

FIG. 4A is a schematic diagram of a NET-ID control table of the NET-ID control apparatus according to Embodiment 1 of the present invention;

FIG. 4B is a schematic diagram of a NET-ID control table of the NET-ID control apparatus according to Embodiment 1 of the present invention;

DETAILED DESCRIPTION OF THE PREFERRED EMBODIMENTS

With reference now to the attached drawings, embodiments of the present invention will be explained in detail below.

Embodiment 1

Figure 1:
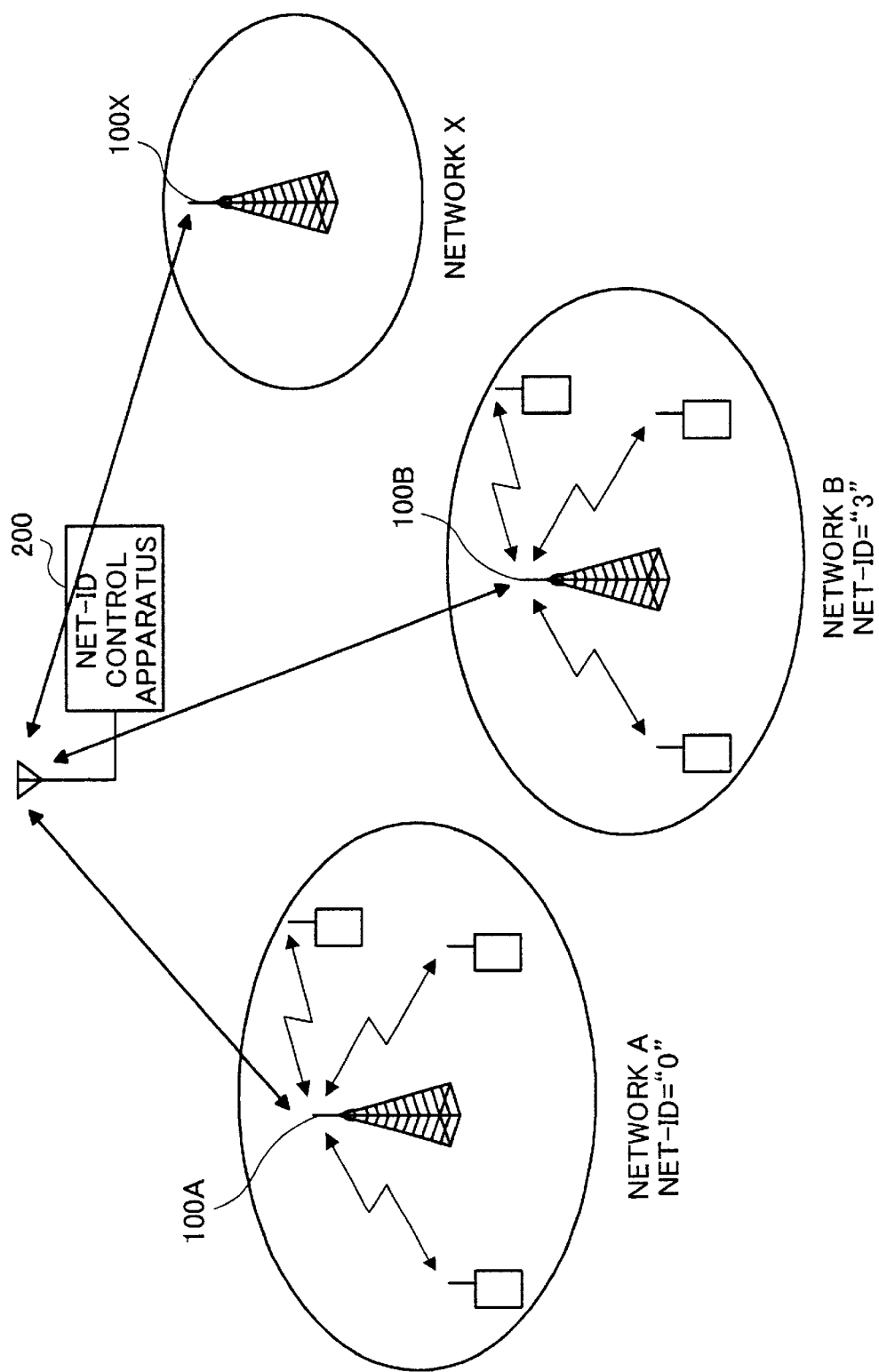
FIG. 1 is a system configuration diagram including base stations and a NET-ID control apparatus according to Embodiment 1 of the present invention.

FIG. 1 is a system configuration diagram including base stations and a NET-ID control apparatus according to Embodiment 1 of the present invention.

Networks are provided with their respective base stations 100A to 100X at the center and communication terminal apparatuses in each network communicate with a base station in their network.

Each network is assigned a unique NET-ID and NET-ID control apparatus 200 performs concentrated control over these NET-IDs.

When a new communication network is installed and power is turned on to a base station, the newly installed base station first sends a NET-ID request signal to NET-ID control apparatus 200.

Upon reception of the NET-ID request signal from the newly installed base station, NET-ID control apparatus 200 searches unused NET-IDs and assigns one arbitrarily selected NET-ID from the detected NET-IDs as the NET-ID for the newly installed base station and sends the assigned NET-ID to the newly installed base station.

Figure 2:
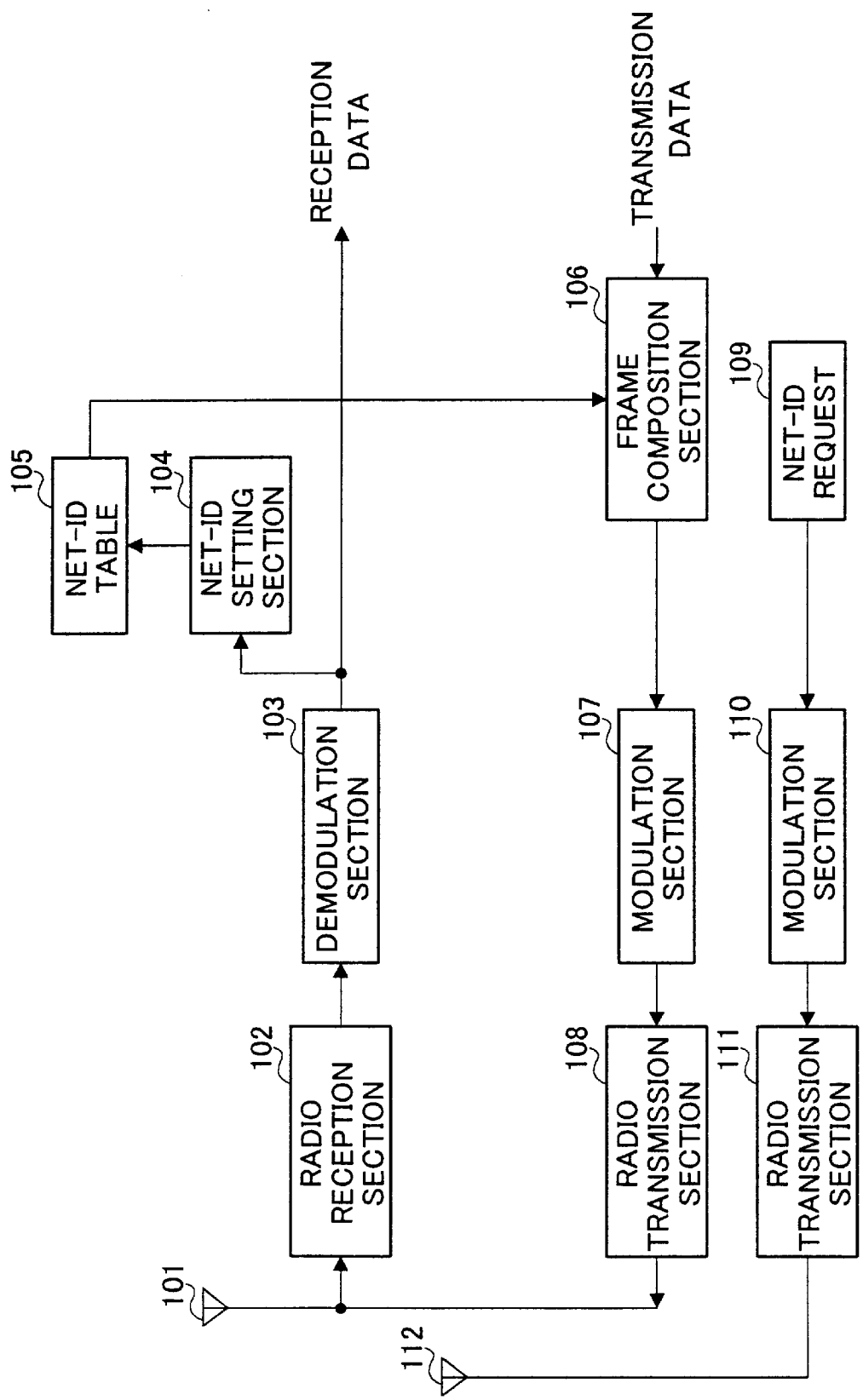
FIG. 2 is a block diagram showing a configuration of a base station according to Embodiment 1 of the present invention.

FIG. 2 is a block diagram showing a configuration of the base station apparatus according to Embodiment 1 of the present invention. Suppose the communication network in the following explanation includes in-house LAN and various radio communication systems, etc.

In the base station apparatus shown in FIG. 2, a signal sent from the other end of communication is received by antenna 101 and sent to radio reception section 102. Radio reception section 102 performs processing such as amplification (gain control), down-conversion and A/D conversion on the reception signal. The signal output from radio reception section 102 is subjected to demodulation processing by demodulation section 103 and reception data is extracted.

Furthermore, the demodulated signal is output to NET-ID setting section 104, NET-ID setting section 104 extracts NET-ID information contained in the signal and writes the NET-ID information to NET-ID table 105 as the NET-ID assigned to the own station.

On the other hand, the transmission data is composed into a frame by frame composition section 106 and a NET-ID written in NET-ID table 105 is inserted as required, modulated by modulation section 107 and sent to radio transmission section 108. Radio transmission section 108 performs processing such as D/A conversion, up-conversion and amplification (gain control) on the modulated signal. The signal output from radio transmission section 108 is transmitted by radio from antenna 101.

Moreover, when a new communication network is installed and power is turned on to the newly installed base station, a NET-ID request signal is sent to the NET-ID control apparatus through a path different from the normal transmission data above.

In the case of FIG. 2, the NET-ID request signal created by NET-ID request section 109 is modulated by modulation section 110 and then sent to radio transmission section 111. Ratio transmission section 111 performs processing such as D/A conversion, up-conversion and amplification (gain control) on the modulated signal. The signal output from radio transmission section 111 is transmitted by radio from antenna 112.

Figure 3:
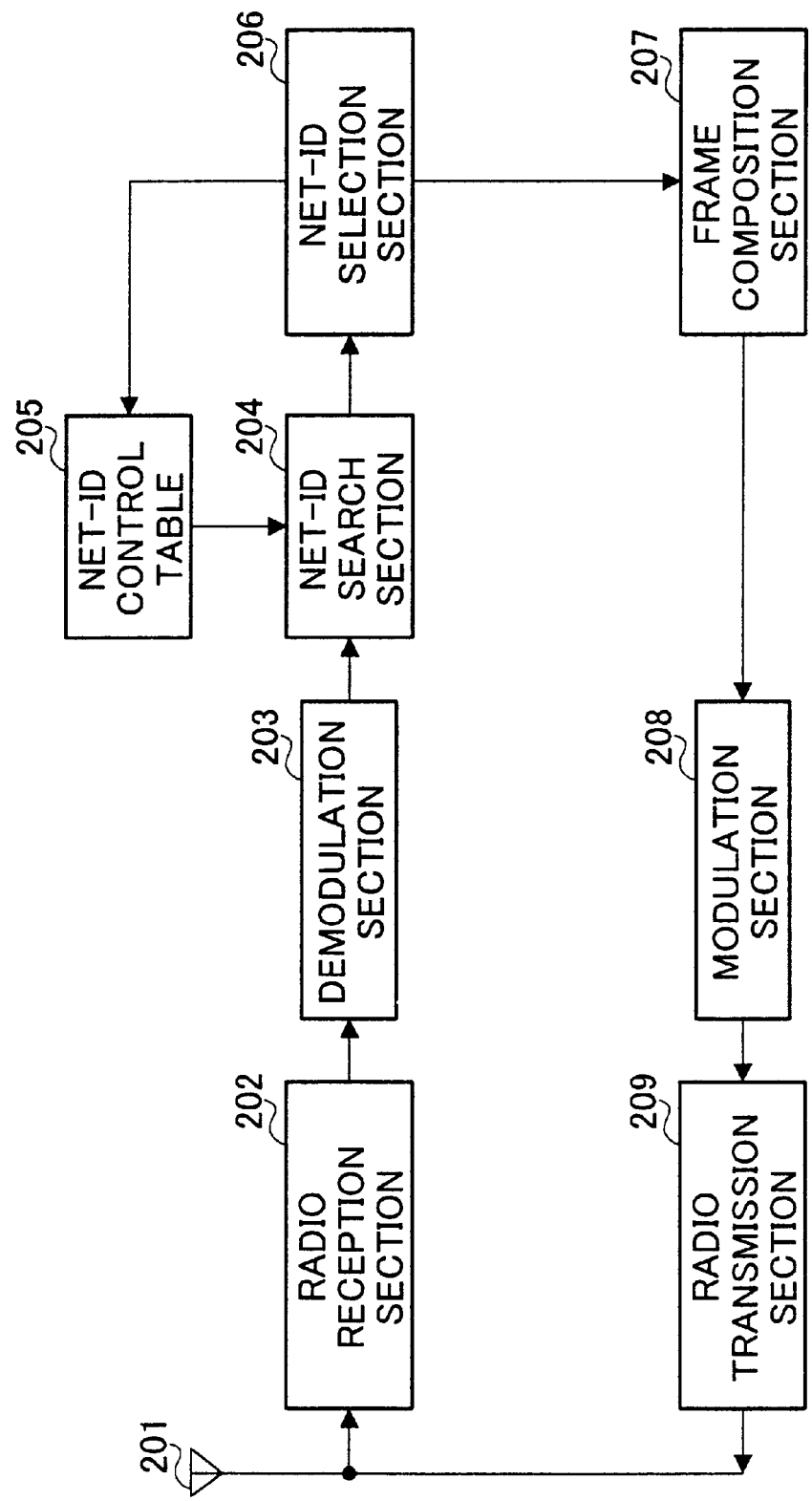
FIG. 3 is a block diagram showing a configuration of a NET-ID control apparatus according to Embodiment 1 of the present invention.

FIG. 3 is a block diagram showing a configuration of the NET-ID control apparatus according to Embodiment 1 of the present invention.

In the NET-ID control apparatus shown in FIG. 3, the radio signal, the NET-ID request signal sent from the newly installed base station is received by antenna 201 and sent to radio reception section 202. Radio reception section 202 performs processing such as amplification (gain control), down-conversion and A/D conversion on the reception signal. The signal output from radio reception section 202 is subjected to demodulation processing by demodulation section 203, the NET-ID request signal extracted and output to NET-ID search section 204.

Then, NET-ID search section 204 searches unused NET-IDs from among the NET-IDs registered in NET-ID control table 205 and NET-ID selection section 206 arbitrarily selects one from the unused NET-IDs and assigns it as the NET-ID of the newly installed base station.

The assigned NET-ID is composed into a frame by frame composition section 207, modulated by modulation section 208 and sent to radio transmission section 209. Radio transmission section 209 performs processing such as D/A conversion, up-conversion and amplification (gain control) on the modulated signal. The signal output from radio transmission section 209 is sent from antenna 201 to the newly installed base station.

FIG. 4A and FIG. 4B are schematic diagrams of a NET-ID control table of the NET-ID control apparatus according to Embodiment 1 of the present invention.

As shown in FIG. 4A and FIG. 4B, the NET-ID control table lists network names currently assigned to NET-IDs. Here, "-" shows "unassigned" in FIG. 4A and FIG. 4B.

For example, as shown in FIG. 4A, suppose NET-ID "0" is currently assigned to network A, NET-ID "3" is assigned to network B and the base station of network X sends a NET-ID request signal.

In this case, NET-ID search section 204 of the NET-ID control apparatus searches unused NET-IDs, NET-ID selection section 206 selects one of the searched unused NET-IDs (for example NET-ID "6") and sends the selected NET-ID from antenna 201 to the newly installed base station and at the same time updates the corresponding section of the NET-ID control table as shown in FIG. 4B (in this example, changes the assignment of NET-ID "6" from "-" to "X").

As shown above, it is possible to prevent NET-IDs from colliding among communication networks by the NET-ID control apparatus performing concentrated control over NET-IDs and assigning NET-IDs to base stations.

In the above explanation, the case where a NET-ID request signal is sent by radio through a path different from a normal transmission data path is explained, but the present invention is not limited to this, and it is also possible to send by radio the NET-ID request signal through the same path as that of normal transmission data when the NET-ID control apparatus exists within the network range.

It is also possible to manually send a NET-ID assignment request and set NET-ID. In this case, it is not necessary to provide a special mechanism to send a NET-ID assignment request and set NET-ID, thus making it possible to simplify the apparatus.

Furthermore, NET-IDs that the newly installed base station acquires from the NET-ID control apparatus can also be acquired by a cable communication network or radio communication network.

Embodiment 2

Embodiment 2 describes a case where a network that decides a NET-ID of the own station using random numbers (hereinafter referred to as "random number network") and a network that uses a NET-ID assigned by the NET-ID control apparatus as the NET-ID of the own station (hereinafter referred to as "control network") coexist and the NET-ID of the control network is prevented from colliding with NET-IDs of other networks.

Figure 5:
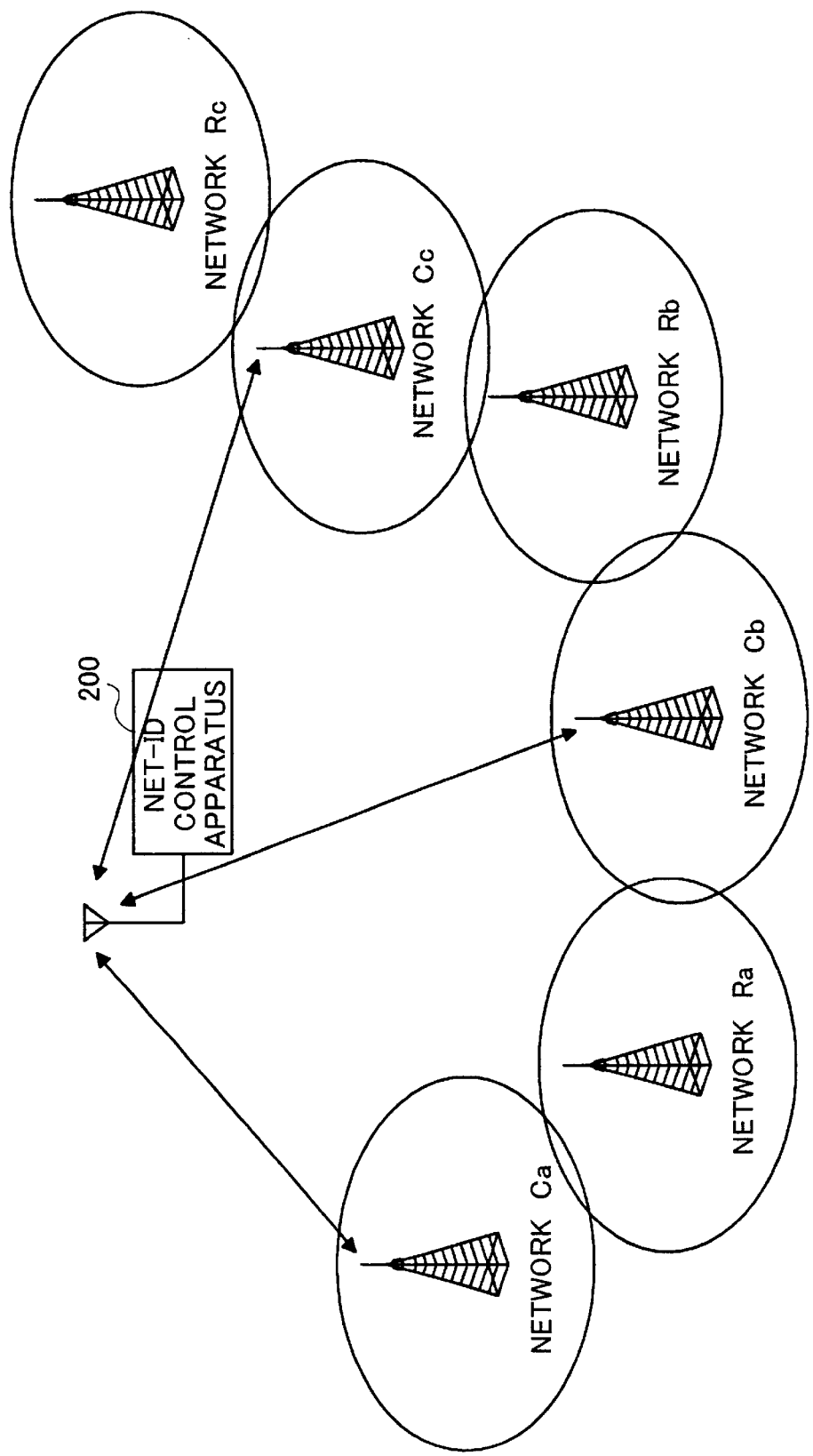
FIG. 5 is a system configuration diagram including base stations and a NET-ID control apparatus according to Embodiment 2 of the present invention.

FIG. 5 is a system configuration diagram including base stations and NET-ID control apparatus according to Embodiment 2 of the present invention.

In FIG. 5, networks Ra to Rc are random number networks and networks Ca to Cc are control networks.

As shown above, determining NET-ID of the own station using random numbers is useful for household and small-sized office in-house LAN networks because of its simplicity and it is anticipated that random number networks will coexist with control networks in the future.

In this case, the NET-ID control apparatus cannot control NET-IDs of random number networks, and therefore there is a risk of control network NET-IDs colliding with each other if no restrictions are imposed on assignment of NET-IDs.

Figure 6:
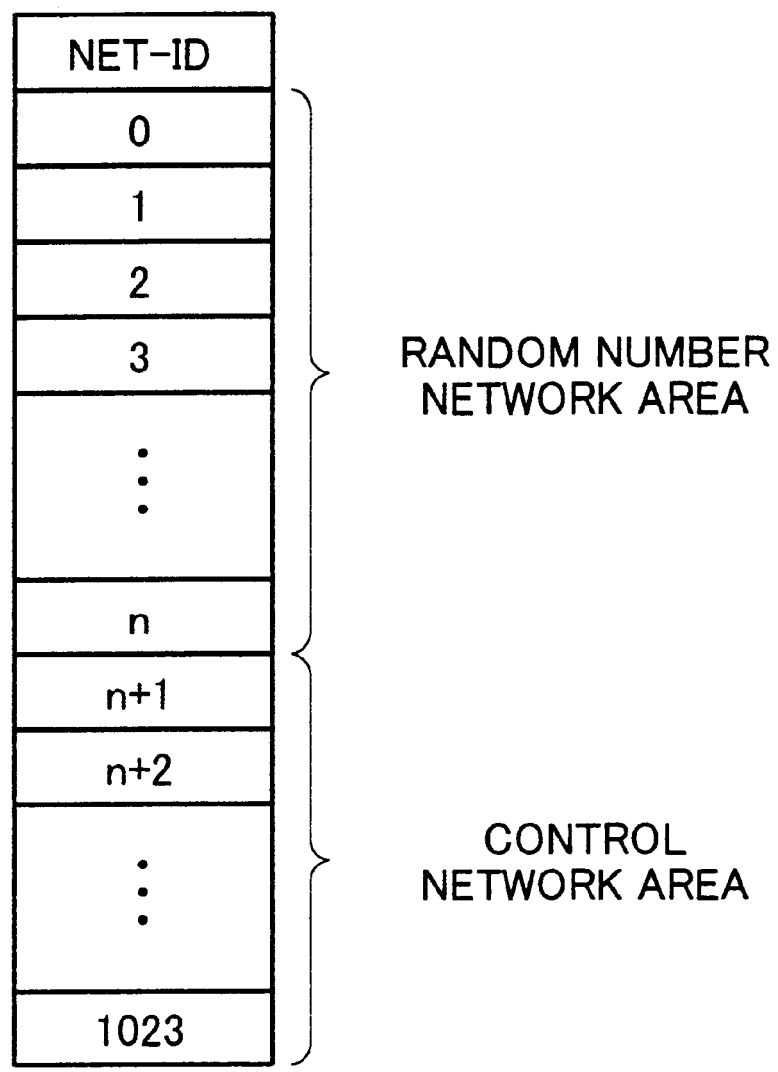
FIG. 6 is a drawing to explain a NET-ID assignment method according to Embodiment 2 of the present invention.

Thus, as shown in FIG. 6, a distinction is made between an area of NET-IDs that can be used for random number networks (hereinafter referred to as "random number network area") and an area of NET-IDs that can be used for control networks (hereinafter referred to as "control network area").

Then, users of a random number network promise to select NET-IDs of their own stations from the random number network area and when the NET-ID control apparatus receives a NET-ID request signal from a newly installed base station, the NET-ID control apparatus searches unused NET-IDs from the control network area and selects one and sends it to the newly installed base station.

This makes it possible to prevent NET-IDs of control networks from colliding with those of other networks even if random networks and control networks coexist.

Here, in the case where NET-IDs of other than the random number network area are selected as NET-IDs of the own station for a random number network base station, this embodiment can also be configured to include a component that rejects that setting.

Embodiment 3

At construction sites, etc., where a private network of a certain size is temporarily installed, it is sometimes simpler to autonomously investigate NET-IDs used in the vicinity and select a NET-ID for the own station rather than requesting the NET-ID control apparatus for a NET-ID.

Embodiment 3 describes a case where in addition to random number networks and control networks, networks that investigate NET-IDs of neighboring networks and autonomously determine NET-IDs of their own stations so that the networks do not collide with other networks (hereinafter referred to as "autonomous network") coexist and NET-IDs of the control networks are prevented from colliding with those of other networks.

Figure 7:
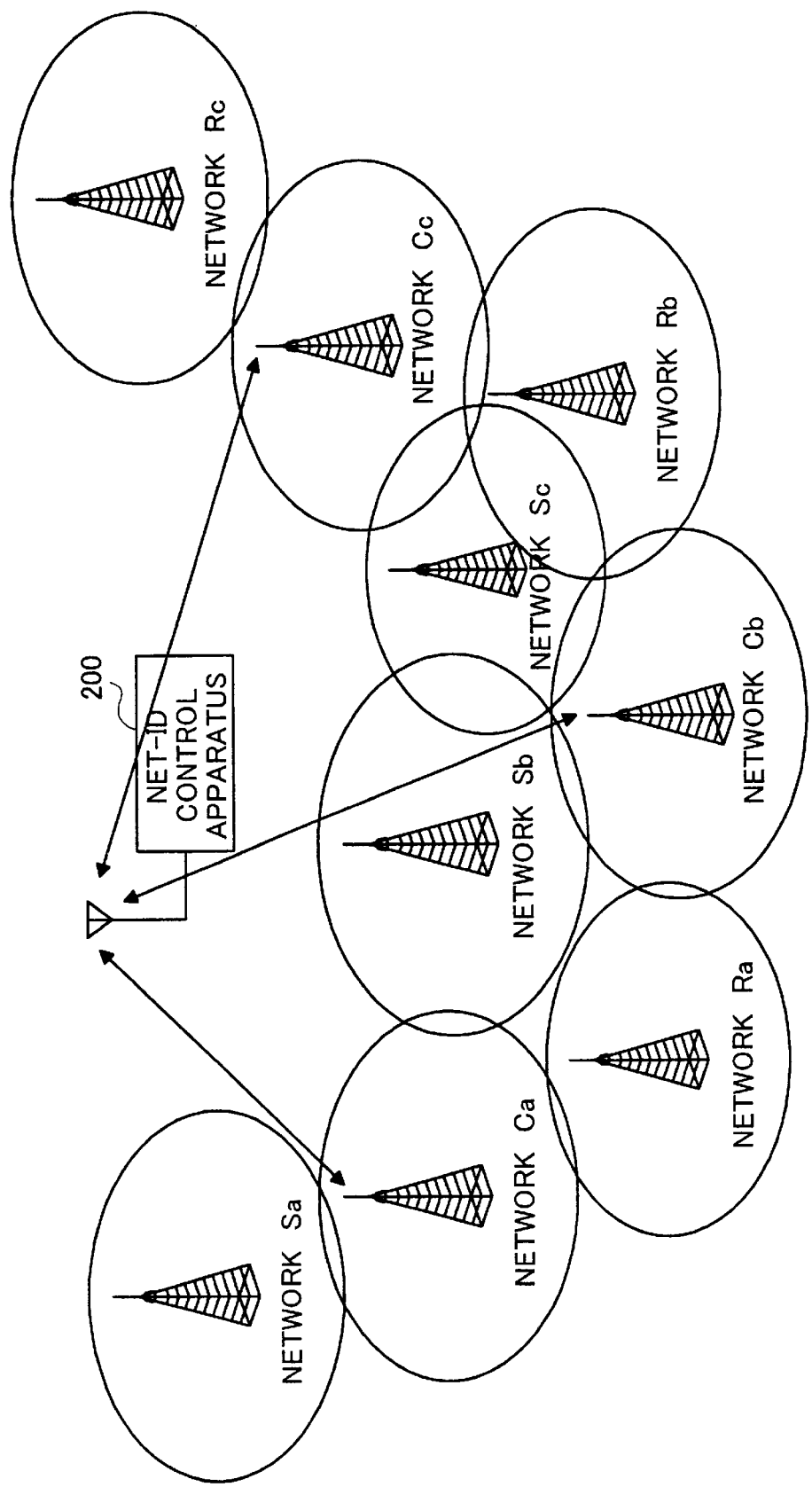
FIG. 7 is a system configuration diagram including base stations and a NET-ID control apparatus according to Embodiment 3 of the present invention.

FIG. 7 is a system configuration diagram including base stations and NET-ID control apparatus according to Embodiment 3 of the present invention.

In FIG. 7, suppose networks Ra to Rc are random number networks and networks Ca to Cc are control networks and networks Sa to Sc are self-control networks.

Figure 8:
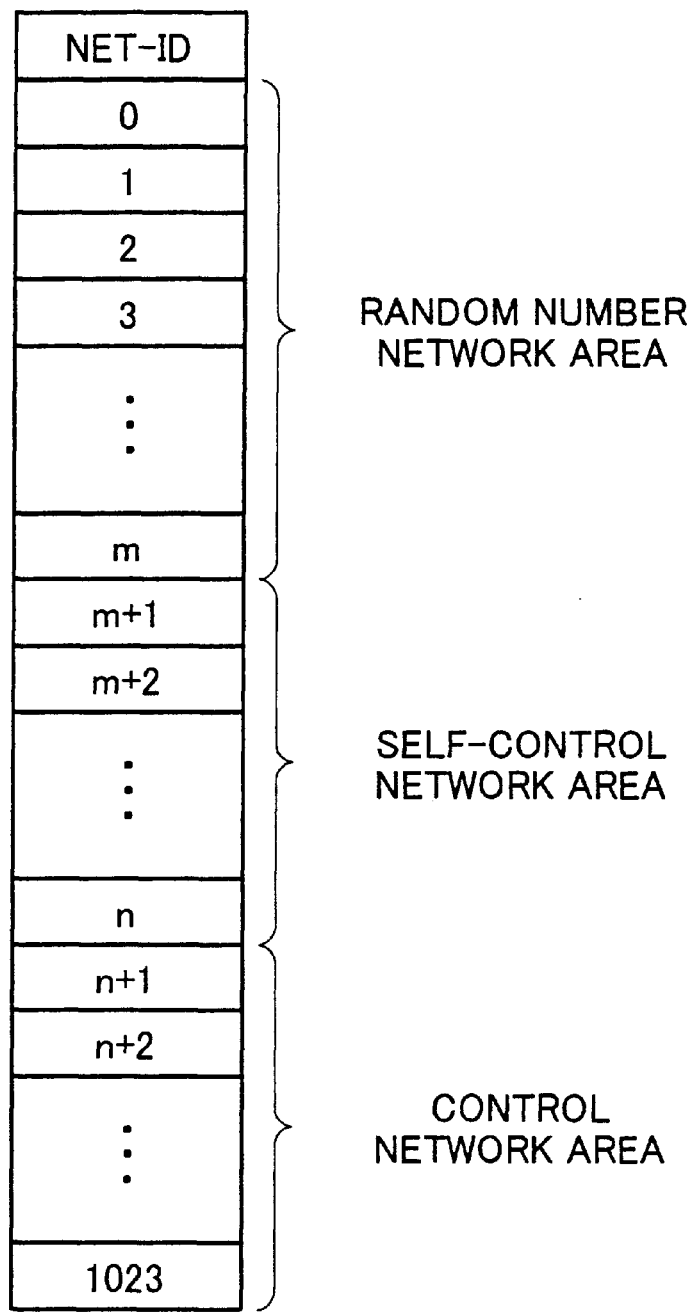
FIG. 8 is a drawing to explain a NET-ID assignment method according to Embodiment 3 of the present invention.

In this embodiment, as shown in FIG. 8, a distinction is made between a random number network area, control network area and moreover an area of NET-IDs that can be used in a self-control network (hereinafter referred to as "a self-control network").

Users of random number networks promise to select NET-IDs of their own stations from the random number network area, while the NET-ID control apparatus searches unused NET-IDs in the control network area when a NET-ID request signal is received from the newly installed base station, selects one of the unused NET-IDs and sends it to the newly installed base station.

On the other hand, the newly installed self-control network base station investigates NET-IDs of neighboring base stations, searches unused NET-IDs in the self-control network area and selects one and registers it as the NET-ID of the own station.

More specifically, when a new self-control network is installed, the newly installed base station outputs a notification request signal requesting an existing base station to notify the content of the NET-ID table.

The base station whose service area overlaps the service area of this newly installed base station, upon reception of a notification request signal, notifies the content of the NET-ID table of the own station through BCCH. By the way, existing base stations are normally notifying base station numbers through BCCH.

The newly installed base station searches unused NET-IDs in the self-control network area based on the base station numbers and NET-ID table content received from other stations, selects one and registers it in the NET-ID table as the NET-ID of the own station.

This prevents NET-IDs of control networks from colliding with other networks even if random number networks, self-control networks and control networks coexist.

As described above, the present invention can prevent network NET-IDs from colliding with those of other networks.

The present invention is not limited to the above described embodiments, and various variations and modifications may be possible without departing from the scope of the present invention.

This application is based on the Japanese Patent Application No. HEI 11-239435 filed on Aug. 26, 1999, entire content of which is expressly incorporated by reference herein.

What is claimed is:

1. A base station apparatus for being used in a digital radio communication system in which a plurality of networks exist including a control network, where an ID control apparatus collectively controls network IDs, and a random-number network, where each bane station determines its network ID using a random number, and network IDs usable on the control network are separated from network IDs usable on the random-number network, wherein the base station apparatus selects its network ID from the network IDs usable on the random-number network.

* * * * *